United States Patent [19]

Tanuma

[11] Patent Number: 5,402,438
[45] Date of Patent: Mar. 28, 1995

[54] SOLID STATE LASER DEVICE

[75] Inventor: Ryohei Tanuma, Kanagawa, Japan

[73] Assignee: Fuji Electric Co., Ltd., Kawasaki, Japan

[21] Appl. No.: 228,082

[22] Filed: Apr. 15, 1994

Related U.S. Application Data

[63] Continuation-in-part of Ser. No. 137,203, Oct. 15, 1993.

[30] Foreign Application Priority Data

Oct. 16, 1992 [JP] Japan ................... 4-277584

[51] Int. Cl.⁶ .............................................. H01S 3/08
[52] U.S. Cl. .................................. 372/99; 372/101; 372/71; 372/27; 372/6; 372/23
[58] Field of Search ................... 372/99, 101, 27, 71, 372/6, 92, 98, 97, 23

[56] References Cited

U.S. PATENT DOCUMENTS

| | | | |
|---|---|---|---|
| 3,427,456 | 2/1969 | Caulfield | 372/99 |
| 4,709,368 | 11/1987 | Fukuda et al. | 372/108 |
| 4,907,235 | 3/1990 | Kuizenga | 372/101 |
| 4,920,541 | 4/1990 | Baumgartner et al. | 372/99 |
| 5,125,001 | 6/1992 | Yagi et al. | 372/99 |
| 5,182,759 | 1/1993 | Anthon et al. | 372/108 |
| 5,241,557 | 8/1993 | Vann | 372/101 |

Primary Examiner—Léon Scott, Jr.
Attorney, Agent, or Firm—Brumbaugh, Graves, Donohue & Raymond

[57] ABSTRACT

For high energy density and improved processing performance of a solid-state laser, the product $\theta d$ of a laser beam with divergence $\theta$ and beam diameter "d" at the beam waist is reduced. Formation of an non-oscillating region as in an output mirror with a pinhole is prevented by use of a hole-type mirror with a central region having reduced reflectance. For increased range of stable oscillation, a beam expander is interposed between a laser medium and the output mirror. The focused beam of a slab laser is made circular by using a columnar light-guiding path on the output side of the output mirror. A laser beam is more readily admitted into an optical fiber by use of a conical light-guiding path. With a hole-type output mirror, two-component laser output from a slab laser has very small $\theta d$ values.

35 Claims, 8 Drawing Sheets

SOLID STATE LASER DEVICE

This is a continuation-in-part application of U.S. patent application Ser. No. 08/137,303, filed Oct. 15, 1993.

BACKGROUND OF THE INVENTION

The present invention relates to a solid-state laser device with a solid-state laser medium arranged between a total reflection mirror and an output mirror.

Solid-state lasers such as YAG lasers have been used widely in the field of laser processing because of their small size and ease of use. Recently, solid-state lasers have become widely used in the measuring and medical fields. In use, solid-state lasers must produce high-quality beams which can be focused on a small area. The quality of a laser beam is generally measured by the product "$\theta d$" where $\theta$ is the beam divergence angle and "$d$" is the beam diameter at the beam waist. The quantity $\theta d$ is conserved even if a laser beam is converted by a lens. In other words, $\theta d = \theta_1 d_1$ holds, where $\theta_1$ is a converging angle when a laser beam is focused by a convex lens, and $d_1$ is the beam-waist diameter at the focal point. Thus, if $\theta_1$ is constant, $d_1$ becomes smaller when $\theta d$ is reduced, so that a laser beam can be focused onto a smaller area. If the laser beam is focused more tightly, a high energy density is obtained, thereby improving the processing performance. Also, for transmission of a laser beam through an optical fiber, a fiber with smaller diameter can be used. A light beam output from such a fiber also has a small cross section.

The following are among techniques for reducing the $\theta d$ value:

(a) increasing the resonator length,
(b) including a beam expander in a resonator,
(c) using an unstable resonator,
(d) using a slab-shaped laser medium in a solid-state laser, and
(e) outputting a laser beam from a pinhole in an output mirror.

Figure 2:
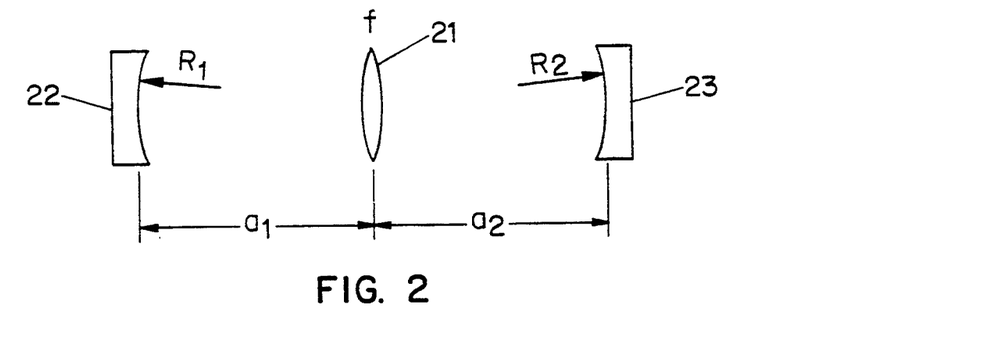
FIG. 2 is a schematic for a thermal lens effect.

With reference to FIG. 2, the stability of an optical resonator including a total-reflection mirror 22 with a radius of curvature $R_1$ and an output mirror 23 with a radius of curvature $R_2$ sandwiching a lens 21 with a focal length "f" at respective distances $a_1$ and $a_2$ may be expressed by the resonator parameters $$g_1 = 1 - a_2/f - a_0/R_1 \text{ and}$$

$$g_2 = 1 - a_1/f - a_0/R_2, \text{ where}$$

$$a_0 = a_1 + a_2 - a_1 a_2/f.$$

Using $g_1$ and $g_2$, a condition that laser light is confined in the resonator is expressed by formula (1):

$$0 < g_1 g_2 < 1 \tag{1}$$

If $g_1$ and $g_2$ change, $\theta$ and d also change.

In a device using a conventional rod-shaped laser medium, the temperature is highest at the rod center, and decreases toward the periphery. Thus, because the laser medium acts as a convex lens (thermal lens), the device has a resonator as represented by FIG. 2. Since the focal length "f" of the thermal lens changes with the input energy, the resonator parameters $g_1$ and $g_2$ change as a result of the laser output. Changes in $g_1$ and $g_2$ not only cause $\theta d$ to change, but may also leave the stability condition in formula (1) unfulfilled, making oscillation difficult.

If resonator length is increased according to (a) above, in order to reduce $\theta d$, then $a_1$ and $a_2$ increase. Therefore, even a small change in "f" can cause $g_1$ and $g_2$ to change significantly, so that targeted performance can be achieved only under a particular condition. Since the technique of using a beam expander according to (b) above amounts to increasing the resonator length, the technique limits the conditions under which targeted performance can be achieved, as in technique (a). Using an unstable resonator according to (c) is very effective for reducing $\theta d$, but if the thermal lens effect is large, high performance can be obtained only in limited conditions, as in (a) and (b) above. Technique (d) reduces the thermal lens effect proper, and hence is basically different from techniques (a), (b) and (c). However, this technique has the drawback that $\theta d$ in the slab-width direction is large. In addition, since a rectangular beam is produced, and as the value of $\theta d$ varies depending on direction, the technique has difficulty in focusing light into a circular spot. These problems cause inconvenience in applications such as laser cutting, since the cut width varies with the beam's direction of movement.

Figure 3:
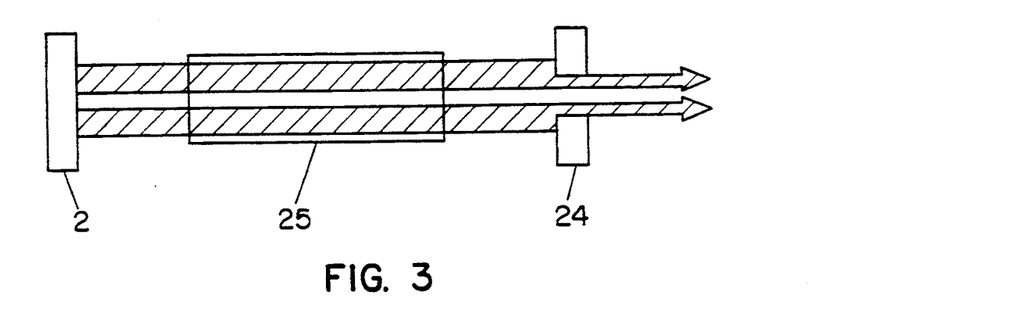
FIG. 3 is a cross section of a laser with a large-diameter pinhole mirror, illustrating an oscillation condition.

Technique (e), wherein a very small pinhole is disposed in an output mirror, has been used since the early days of lasers, mainly in gas lasers with small gain. An example is disclosed in the paper by C. K. N. Patel et al., Appl. Phys. Lett., Vol. 4, No. 1 (1964), p. 18. Also, a paper by D. E. McCumber, Bell System Technical Journal, Vol. 44 (1965), p. 333 gives a detailed analysis of a resonance mode in which a hole is provided in an output mirror. A system that uses an output mirror with a hole has a $\theta$-value nearly equal to one using a conventional partially permeable mirror, where $\theta d$ can be reduced by limiting the "d" value. In this case, the transmittance of the output mirror can be determined as the proportion of the pinhole area relative to that of the beam cross-section. However, this relationship holds true only when the pinhole diameter is small. As the pinhole diameter increases, the effective transmittance of the output mirror does not become larger in proportion to the diameter because, with reference to FIG. 3, laser oscillation cannot occur around the center of a laser medium 25 if the diameter of the hole in an output mirror 24 opposite to a total reflection mirror 2 is large relative to the laser medium 25. Therefore, the effective transmittance is smaller than the value determined by the ratio of pinhole area to beam cross-section. For this reason, it becomes more difficult for a laser with large optimal transmittance to achieve the targeted transmittance, and high efficiency cannot be obtained. Also, the presence of a non-oscillating portion reduces efficiency. Furthermore, all solid-state lasers suffer from a common problem relating to admittance of light into an optical fiber. As described above, the diameter of the focused light spot can be made smaller than an optical fiber diameter by reducing $\theta d$ below a certain targeted value. However, even if this condition is met, a laser beam can only then be admitted into a conventional optical fiber with a diameter of 1 mm or less when the focused light spot matches up with the light-admitting end of the fiber. Such adjustment is difficult and costly.

SUMMARY OF THE INVENTION

A first objective of the present invention is to overcome the above-mentioned deficiencies in conventional solid-state lasers, and to provide a solid-state laser that can oscillate a high quality laser beam with a smaller $\theta d$ value in a wide range of operating conditions. A second objective of the present invention is to overcome the abovementioned deficiencies in conventional slab lasers, and to yield circularly converged beams. A third objective of the present invention is to overcome the above-mentioned deficiencies in conventional solid-state lasers as they relate to optical fibers, and to provide a solid-state laser for easy admission of laser light into an optical fiber.

In accordance with the present invention, a solid-state laser device for emitting a laser beam is provided. The device includes a total reflection mirror, means for reducing the $\theta d$ of the laser beam, and a solid-state laser medium. The means for reducing the $\theta d$ of the laser beam preferably includes an output mirror having an inside surface and an outside surface, where the inside surface is of high reflectance except at a predetermined central region, and of low reflectance at the predetermined central region, where the laser beam is to be emitted. With such an output mirror, the solid-state laser medium is arranged between the full reflection mirror and the inside surface of the output mirror. Twelve exemplary embodiments of the invention will be described, each of them having one or several preferred aspects.

In order to achieve the first objective, a solid-state laser device according to a preferred first embodiment provides an optical resonator having a total reflection mirror and an output mirror arranged with their reflection faces opposing each other, a solid-state laser medium arranged between the total reflection mirror and the output mirror, wherein the reflection surface of the output mirror is of high reflectance except at a predetermined central region, and of low reflectance at the predetermined central region, and a beam expander to increase the diameter of the laser beam in the direction toward the laser medium is arranged between the laser medium and the output mirror.

A solid-state laser device according to a preferred second embodiment provides an optical resonator having a total reflection mirror and an output mirror arranged with their reflection faces opposing each other, a solid-state laser medium arranged between the total reflection mirror and the output mirror, wherein the reflection surface of the output mirror is of high reflectance except at a predetermined central region, and of low reflectance at the predetermined central region, and a beam expander to increase the diameter of the laser beam in the direction toward the output mirror is arranged between the laser medium and the output mirror.

In order to achieve the above first and second objectives, a solid-state laser device according to a third preferred embodiment provides an optical resonator having a total reflection mirror and an output mirror arranged with their reflection faces opposing each other, a slab-shaped solid-state laser medium having a pair of opposing optically polished sides arranged between the total reflection mirror and the output mirror so that a laser beam will advance while repeating total reflection alternately on the opposing optically polished sides, wherein the reflection surface of the output mirror is of high reflectance except at a predetermined central region, and of low reflectance at the predetermined central region, and a cylindrical light guiding path having a diameter approximately the same as the shortest cross-distance of the low-reflectance region of the output mirror is arranged on the output side of the output mirror.

In order to achieve the above first and third objectives, a solid-state laser device according to a fourth preferred embodiment provides an optical resonator having a total reflection mirror and an output mirror, arranged with their reflection faces opposing each other, a solid-state laser medium arranged between the total reflection mirror and the output mirror, wherein the reflection surface of the output mirror is of high reflectance except at a predetermined central region, and of low reflectance at the predetermined central region, and a conical light guiding path which has a light-admitting-side diameter approximately the same as the shortest cross-distance of the low-reflectance region of the output mirror, where the diameter decreases in a direction away from the output mirror is arranged on the output side of the output mirror.

In order to achieve the above first objective, a fifth preferred embodiment provides a solid-state laser device with a slab-shaped solid-state laser medium having a pair of opposing, optically polished sides arranged between a total reflection mirror and an output mirror arranged with their reflection faces opposing each other, so that a laser beam will advance while repeating total reflection alternately on the opposing, optically polished sides of the laser medium, wherein the reflection surface of the output mirror is of high reflectance except at a predetermined central region, and of low reflectance at the predetermined central region, and the beam waist of an oscillating laser beam is formed on the output mirror, and the laser beam is divided into two components and aligned in parallel by a correction optical system arranged externally to the resonator. The correction optical system may be of one of three types: a roof-shaped prism arranged with its roof ridge line perpendicular to the plane of the two laser output beam components, and with its roof ridge line midway between the two components; a right-angled prism that reverses and reverts one of the laser output beam components, and reflects the component upon a high-reflectance region of the outside surface of the output mirror; or a corner cube that reverses and reverts one of the laser output beam components, and reflects the component again upon a high-reflectance region of the outside surface of the output mirror.

A preferred sixth embodiment provides a solid-state laser device with a slab-shaped solid-state laser medium having a pair of opposing, optically polished sides arranged between a total reflection mirror and an output mirror arranged with their reflection faces opposing each other, so that a laser beam will advance while repeating total reflection alternately on the opposing, optically polished sides of the laser medium, wherein the reflection surface of the output mirror is of high reflectance except at a predetermined central region, and of low reflectance at the predetermined central region, and a beam waist of an oscillating laser beam is formed on the output mirror; the laser beam is divided into two components, one of which is re-reflected into the resonator from the low-reflectance region in the output mirror. In a particularly preferred configuration, one of the output beams is reflected by a rectangular prism or by a corner cube.

In order to achieve the above first objective, a preferred seventh embodiment provides a solid-state laser device with a slab-shaped solid-state laser medium having a pair of opposing, optically polished sides arranged between a total reflection mirror and an output mirror arranged with their reflection faces opposing each other, so that a laser beam will advance while repeating total reflection alternately on the opposing optically polished sides of the laser medium, wherein the reflection surface of the output mirror is of high reflectance except at a predetermined central region, and of low reflectance at the predetermined central region, and a beam waist of an oscillating laser beam is formed on the output mirror; the laser beam is divided into two components, and means are included to make the oscillating laser light linearly polarized; means to convert the two components of the laser output light beam into light in which the planes of polarization in the two beams are perpendicular to each other; and means to superimpose the two beams after the polarization planes have been converted.

A preferred eighth embodiment provides a solid-state laser device with a slab-shaped solid-state laser medium having a pair of opposing, optically polished sides arranged between a total reflection mirror and an output mirror, arranged with their reflection faces opposing each other, so that a laser beam will advance while repeating total reflection alternately on the opposing, optically polished sides of the laser medium, wherein means are included to make the oscillating laser beam linearly polarized light; means to split the laser output beam into two components spatially in the direction of the slab width; means to convert the two-component laser output beam into light in which the planes of polarization of the two beams are perpendicular to each other; and means to superimpose the two beams after the polarization planes have been converted.

In order to achieve the above first objective, a preferred ninth embodiment provides a solid-state laser device with a cylindrical solid-state laser medium arranged between a total reflection mirror and an output mirror, arranged with their reflection faces opposing each other, wherein the reflection surface of the output mirror is of high reflectance except at a predetermined circular central region, and of low reflectance at the predetermined circular central region, and a beam waist of an oscillating laser beam is formed on the output mirror, and means to convert the laser output beam that propagates conically spreading into a cylindrical beam is included. The laser output beam may be effectively converted into a cylindrical beam by using a conical lens.

A preferred tenth embodiment provides a solid-state laser device with a slab-shaped solid-state laser medium having a pair of opposing, optically polished sides arranged between a total reflection mirror and an output mirror, arranged with their reflection faces opposing each other, so that a laser beam will advance while repeating total reflection alternately on the opposing, optically polished sides of the laser medium, wherein the reflection surface of the output mirror is of high reflectance except at a predetermined central region, and of low reflectance at the predetermined central region, and a beam waist of an oscillating laser beam is formed on the output mirror, and the laser output beam is divided into two components and admitted into separate optical fibers.

A preferred eleventh embodiment provides a solid-state laser device with a slab-shaped solid-state laser medium having a pair of opposing, optically polished sides arranged between a total reflection mirror and an output mirror, arranged with their reflection faces opposing each other, so that a laser beam will advance while repeating total reflection alternately on the opposing optically polished sides of the laser medium, wherein the laser output beam is split into two components spatially in the direction of the slab width, and the split laser beams are admitted into separate optical fibers.

A preferred twelfth embodiment provides a solid-state laser device with a solid-state laser medium arranged between a total reflection mirror and an output mirror, arranged with their reflection faces opposing each other, wherein the reflection surface of the output mirror is of high reflectance except at a predetermined central region, and of low reflectance at the predetermined central region, and the resonator is configured and arranged such that the laser beam diameter in the resonator reaches a maximum on the output mirror. The low-reflectance region in the output mirror should preferably be of circular form, or of striped form if the solid-state laser medium is slab-shaped.

BRIEF DESCRIPTION OF THE DRAWING

FIG. 18b is a side view of a component of the device shown in FIG. 18a.

DETAILED DESCRIPTION OF PREFERRED EMBODIMENTS

In the figures, analogous parts have the same reference numeral.

Figure 1:
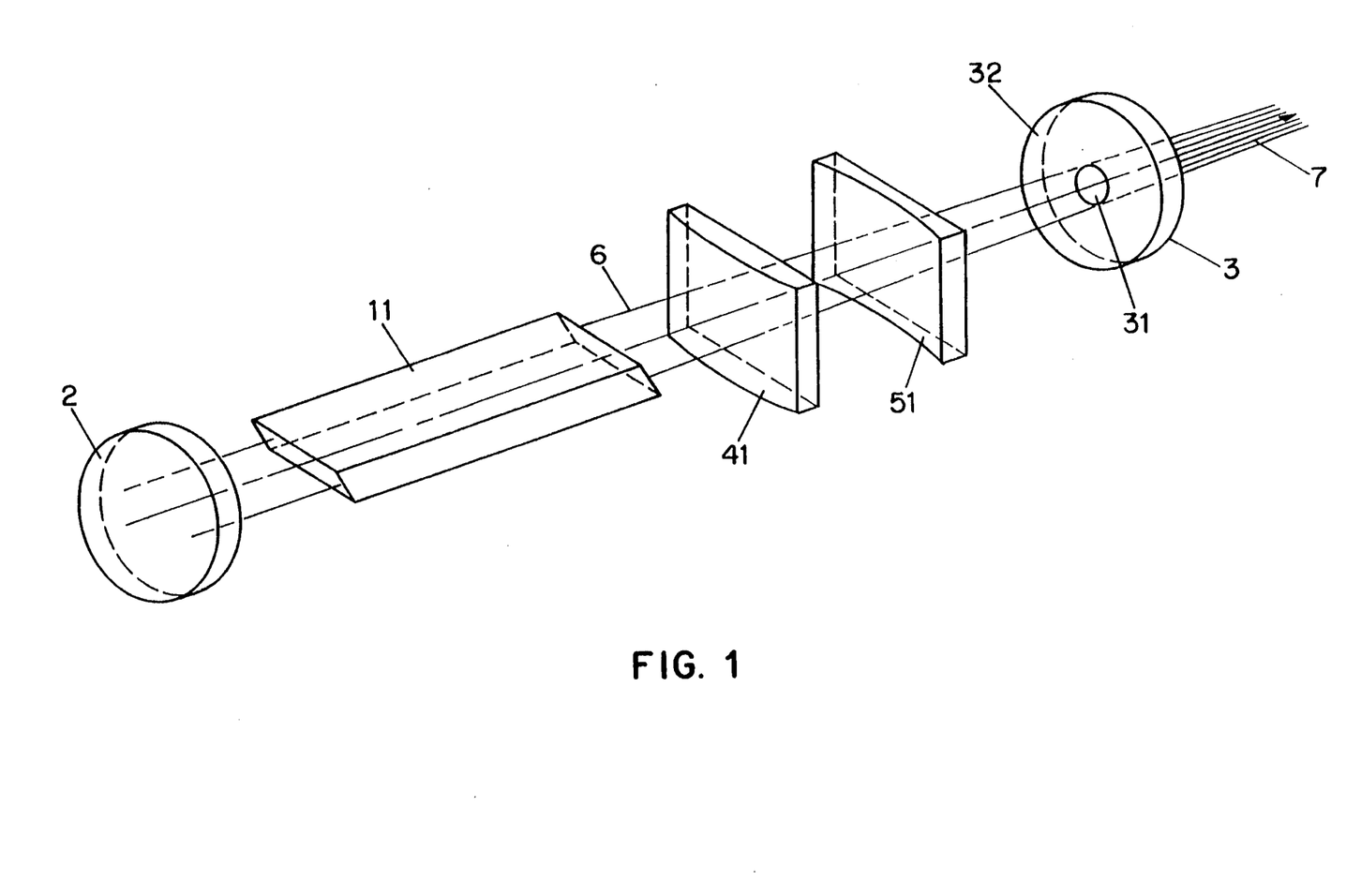
FIG. 1 is a perspective view of a solid-state laser device illustrating the preferred first embodiment.

FIG. 1 shows a slab-type Nd:YAG laser, for example. As it is, the slab-shaped solid-state laser medium already has a very small $\theta d$ value in its thickness direction. In accordance with an aspect of the present invention, the $\theta d$ value is improved in the slab-width direction. A total reflection mirror 2 is arranged on one side of a slab-shaped solid-state laser medium 11 made of Nd:YAG. An output mirror 3 is arranged on the other side of the slab-shaped solid-state laser medium 11. The output mirror 3 has a central circular transmitting portion 31 having relatively low reflectance, within a reflecting face of high reflectance 32. The total reflection mirror 2 and the output mirror 3 form an optical resonator. A beam expander consisting of a convex cylindrical lens 41 arranged close to the solid-state laser medium 11, and a concave cylindrical lens 51 arranged close to the output mirror 3 is disposed between the solid-state laser medium 11 and the output mirror 3. This beam expander expands the diameter of the laser beam in the direction towards the laser medium 11. The reflection face 32 of the output mirror 3 is formed as a high-reflectance coating on glass, with an uncoated center portion serving as the transmitting portion 31. For optimal transmittance, the diameter of the transmitting portion 31 may be 6 mm, for example.

The laser beam 6 output from the solid-state laser medium 11 and going toward the output mirror 3 has its beam width reduced by the beam expander consisting of the cylindrical lenses 41 and 51, and then reaches the output mirror 3. If the size of the cross section in either the longitudinal or lateral direction of the laser beam 6, after the beam diameter has been reduced, is larger than the diameter of the transmitting portion 31, the cross sectional shape of the laser output beam 7 is circular immediately after having been output from the output mirror 3; thus, the near-field pattern (NFP) is circular. However, since the solid laser medium 11 is slab shaped, the distribution of the beam spread angle $\theta$ in the cross-sectional direction of the beam is rectangular. Because of this, the cross-sectional shape of the laser beam 7 is rectangular at a point sufficiently away from the output mirror 3; thus, the far-field pattern (FFP) is rectangular. If the size of the cross section in either the longitudinal or lateral direction of the laser beam 6 incident on the output mirror 3 is less than the diameter of the transmitting portion 31, a parallel portion of a rectangle appears on part of the NFP.

Figure 8:
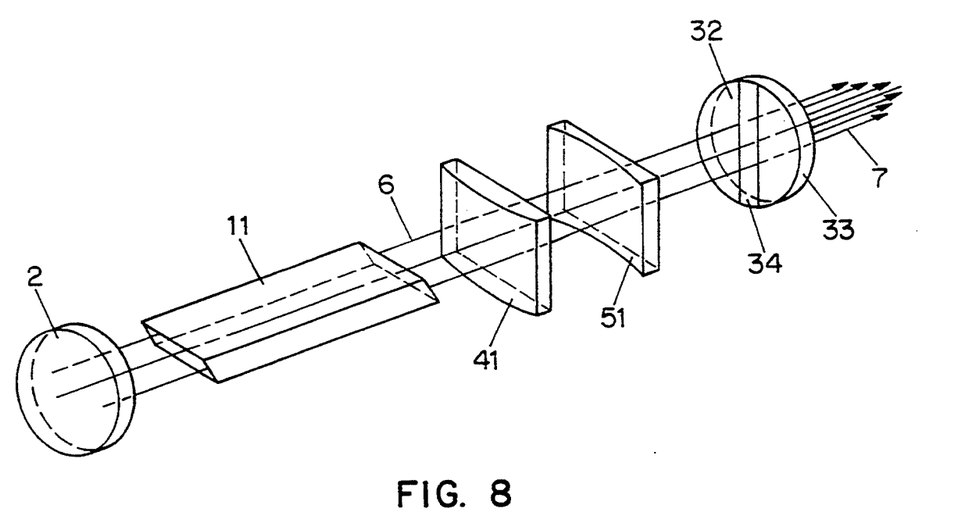
FIG. 8 is a perspective view of a solid-state laser device in an alternative configuration of the first embodiment.

The configuration illustrated by FIG. 8 differs in that a striped mirror 33 having a transmitting portion 34 is used as an output mirror. Since $\theta d$ in the slab thickness direction is small to begin with, improving $\theta d$ only in the width direction may suffice in many cases. Thus, as in this example, a striped mirror that limits the beam width only in the slab width direction may be used in a slab laser in place of the hole-type output mirror. This can be applied to all of the embodiments with slab lasers described below.

Figure 9:
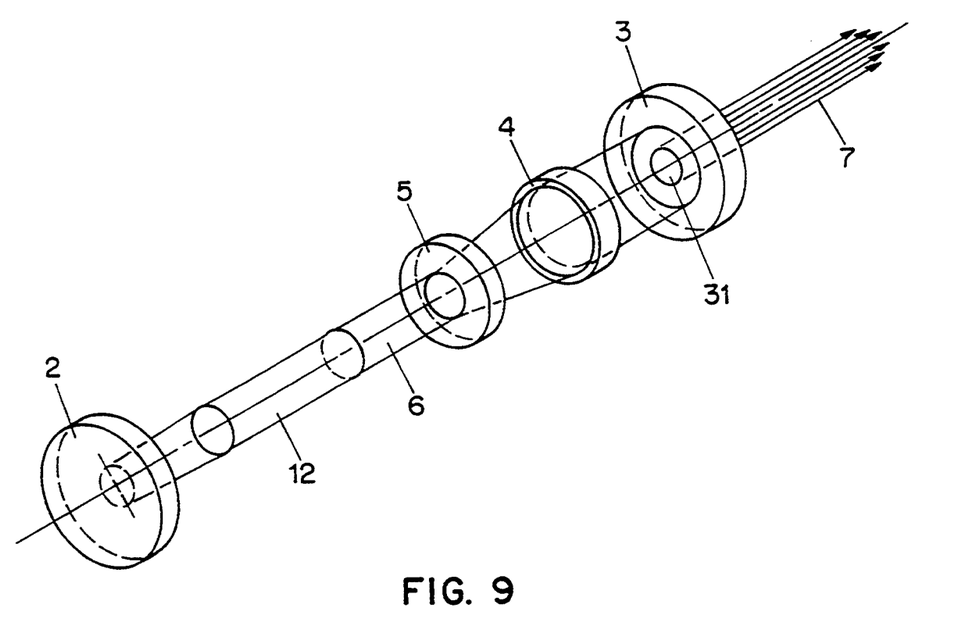
FIG. 9 is a perspective view of a solid-state laser device illustrating the preferred second embodiment.

FIG. 9 shows a beam expander consisting of a concave lens 5 arranged close to a rod-shaped solid-state laser medium 12 made of Nd:YAG, and a convex lens 4 arranged close to the output mirror 3, between the solid-state laser medium 12 and the output mirror 3. This beam expander expands the diameter of the laser beam 6 in the direction toward the output mirror 3 from the solid-state laser medium 12. In this case, both the NFP and the FFP are circular. The diameter of the transmitting portion 31 of the output mirror 3 may be from 4 mm to 5 mm, for example.

Figure 10:
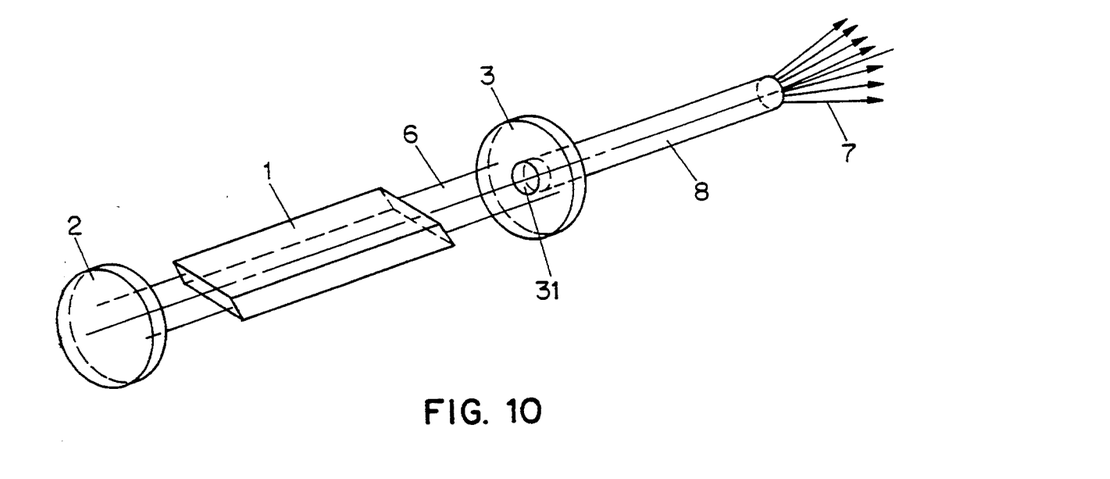
FIG. 10 is a perspective view of a solid-state laser device illustrating the preferred third embodiment.

For a slab-type laser, FIG. 10 shows a columnar light guiding path 8 having approximately the same diameter as the transmitting portion 31, disposed closely behind the output side of the output mirror 3. The columnar light guiding path 8 uses a glass rod with sides of sufficient optical flatness for total internal reflection. A laser beam output from the output mirror 3 first enters the columnar light guiding path 8. Almost all of the directional components are totally reflected several times on the side face, and then emerge as laser output beam 7 from the end of the light guiding path 8. Because the directions of the laser beam are thus mixed within the light guiding path 8, the NFP and FFP of the laser output beam 7 both become circular. A lens can be used to produce a focused circular beam. Also, because the $\theta d$ value is retained when passing through the light guiding path 8, the $\theta d$ value for the laser output beam 7 never exceeds the maximum $\theta d$ value of the light entering the light-guiding path.

Figure 11:
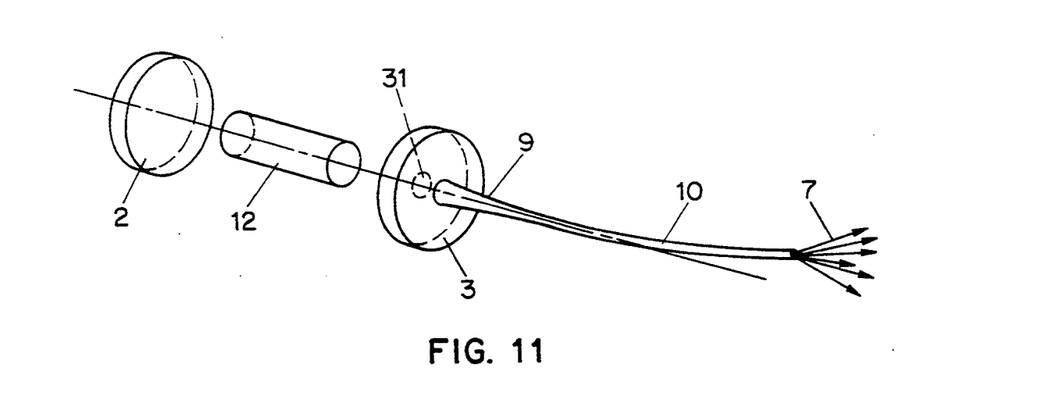
FIG. 11 is a perspective view of a solid-state laser device illustrating the preferred fourth embodiment.

FIG. 11 shows rod-type Nd:YAG laser. A conical light guiding path 9 is disposed closely at the output side of the output mirror 3. The light guiding path 9 is tapered for direct transfer of the emitted laser light into the fiber 10 and connects to an optical fiber 10. Since the $\theta d$ value is conserved, the $\theta d$ value for the laser output beam 7 emitted from the light emitting end of the optical fiber 10 is the same as to the $\theta d$ value of the laser beam emitted from the output mirror 3.

In alternative embodiments, a rod-shaped laser medium replaces the slab-shaped medium in FIGS. 1 and 8, or a slab-shaped laser medium replaces the rod-shaped medium in FIG. 11. Also, a beam expander as shown in FIGS. 1 and 8 can be included in structures according to FIGS. 10 and 11.

Figure 7A:
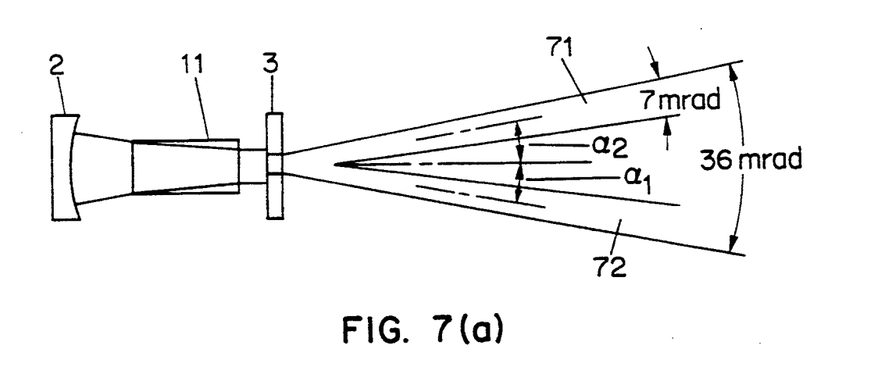
FIG. 7a is a schematic of a laser with diverging separated beams.
Figure 7B:
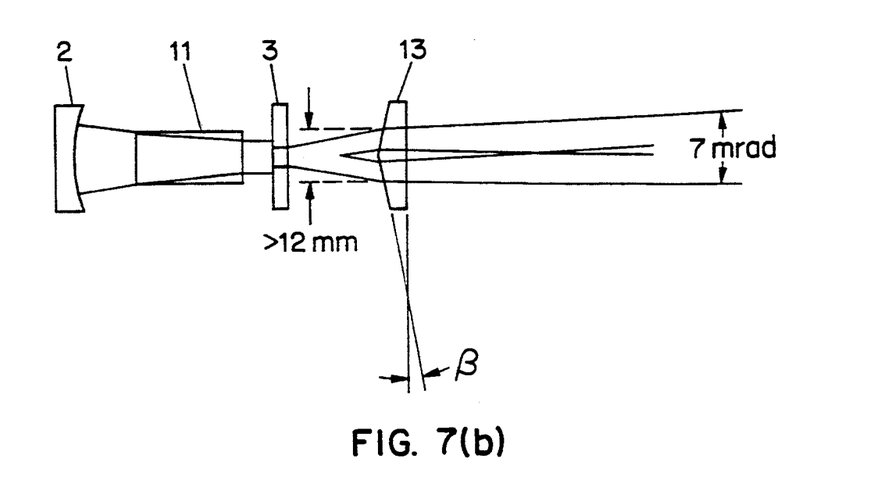
FIG. 7b is a schematic of a laser system including means for correcting separated beams into parallel alignment.
Figure 12:
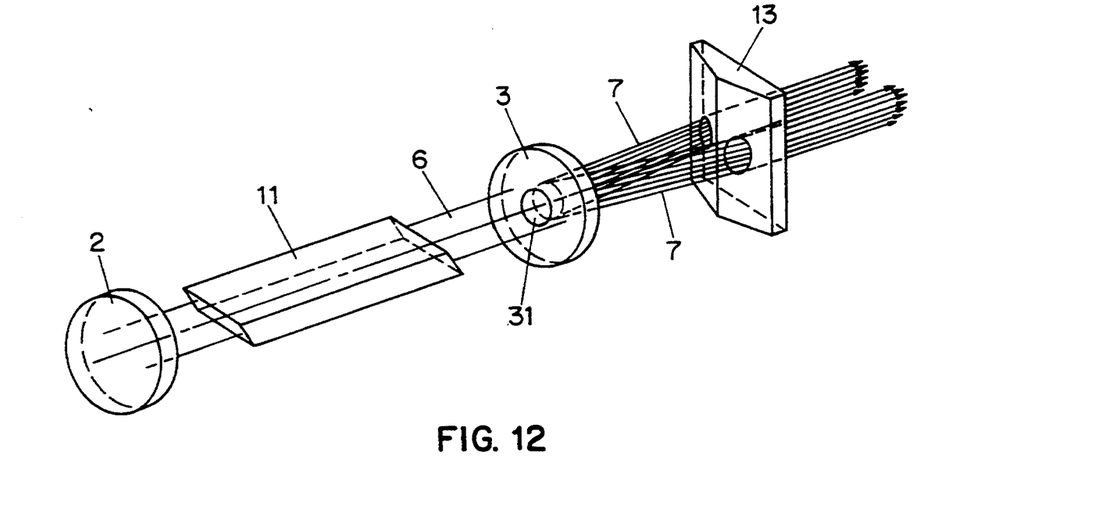
FIG. 12 is a perspective view of a solid-state laser device illustrating the preferred fifth embodiment.

FIG. 12 shows the laser output beam 7 divided into two beams and corrected into parallel beams by a roof prism 13. This is similar to the case shown in FIG. 7b. However, in the embodiment of FIG. 12, it is necessary to change the angle $\beta$ shown in FIG. 7 in response to the total beam divergence. This may require preparation of several trial prisms with different $\beta$ values, for selection of the most suitable prism. Furthermore, if the beam divergence changes depending on output, an optimal condition can no longer be maintained under changing operating conditions, and the value of $\theta$ may increase after correction even if the most suitable prism was selected for a specific condition.

Figure 13:
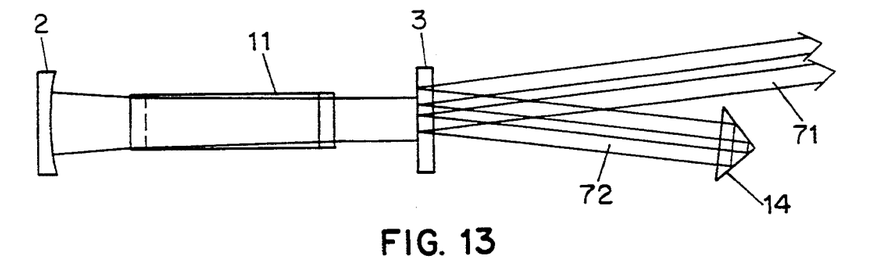
FIG. 13 is a front view of a solid-state laser device in an alternative configuration of the fifth embodiment.

This difficulty is overcome as illustrated by FIG. 13. First, with reference to FIG. 7a, it is noted that $\alpha_1 = \alpha_2$, where $\alpha_1$ and $\alpha_2$ are the angles formed by the output component beams 71 and 72 with the center line. It follows that the wave front of an oscillating laser beam is parallel to the output mirror face. By utilizing this fact, the two beams can be made parallel automatically by reverting one of the component beams 72 at a rectangular prism 14 and reflecting it at a high-reflectance portion of the output surface of the output mirror 3, as shown in FIG. 13. In this system, the prism no longer needs to be changed to suit the beam divergence.

Figure 14:
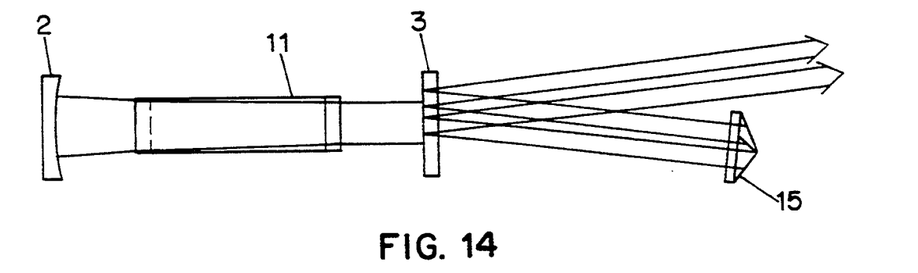
FIG. 14 is a front view of a solid-state laser device in a further alternative configuration of the fifth embodiment.

In the embodiment of FIG. 14, a corner cube 15 replaces the rectangular prism 14 of FIG. 13. Since, regardless of its orientation, the corner cube 15 reflects the light anti-parallel, adjustment is facilitated as compared with a rectangular prism.

Figure 15:
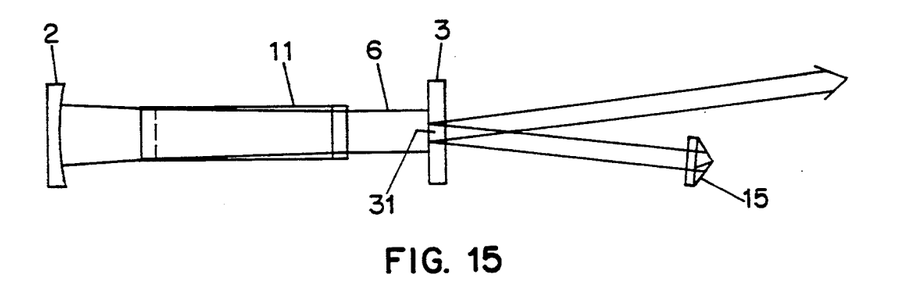
FIG. 15 is a front view of a solid-state laser device illustrating the preferred sixth embodiment.

FIG. 15 shows one of the two separated component beams reflected by a corner cube 15, and then re-introduced into the resonator from the transmitting portion of the hole-type output mirror 31. While it is not possible to re-introduce all of the reflected light back into the resonator, reflected light which is not re-introduced is reflected by the output mirror 3 parallel to the other light beam, as explained for the fifth embodiment. Thus, a single laser beam can be obtained nevertheless, and the value of $\theta d$ can be made about one-half of that of the fifth embodiment. In this case also, a rectangular prism as in FIG. 13 may be used instead of a corner cube.

Figure 16:
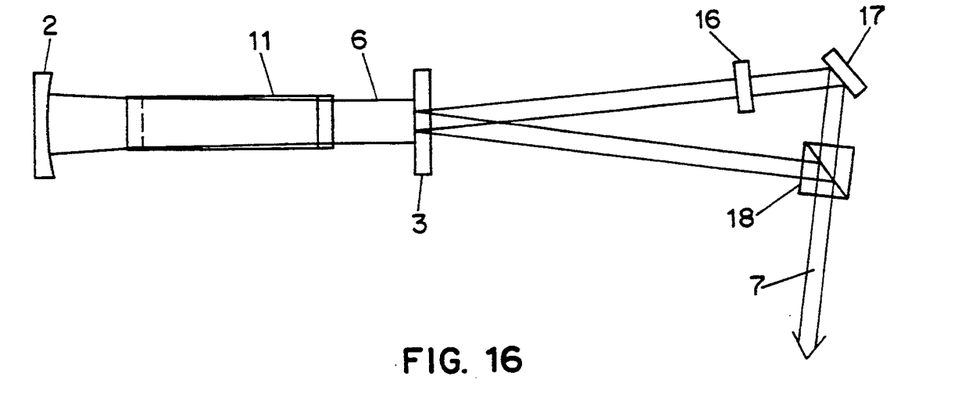
FIG. 16 is a front view of a solid-state laser device illustrating the preferred seventh embodiment.

FIG. 16 shows the laser-light-admitting end face of a ND:YAG slab laser 11 cut at Brewster angle. In case of incidence at Brewster angle, while the S-polarized component (with polarization plane parallel to the sheet face) is subject to loss at the admittance face, the P-polarized component (with polarization plane perpendicular to the sheet face) suffers no loss. Therefore, a laser output beam 6 is essentially linearly polarized as a P-polarized beam. In this configuration, one of the two divided laser beams has its polarization plane rotated 90° by a $\lambda/2$-plate 16, and is admitted into a polarization beam splitter 18 via a 45° mirror 17. This polarization beam splitter 18 reflects P-polarized light (S-polarized light against the splitter) and passes S-polarized light (P-polarized light against the splitter). Thus, as shown in FIG. 16, the two beams are superposed into one laser beam 7, to form an elliptically polarized beam. A $\theta d$-value in the same range as in the sixth embodiment can be obtained.

Figure 17:
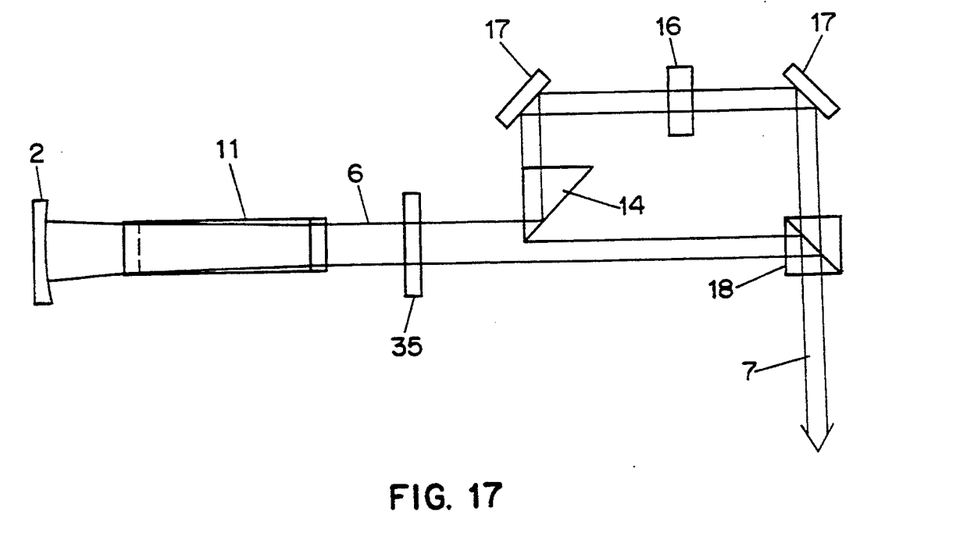
FIG. 17 is a front view of a solid-state laser device illustrating the preferred eighth embodiment.

FIG. 17 shows an ordinary partially transmitting mirror 35 as an output mirror. A P-polarized laser beam is produced as described for FIG. 16. As shown in FIG. 17, about half of the output beam is divided by a prism 14 and split off. The split-off beam passes through a detour formed by the two 45° mirrors 17, and its polarization plane is rotated 90° by a $\lambda/2$-plate 16 inserted halfway along the detour. The two beams are combined into one elliptically polarized laser beam 7 as described for FIG. 16, and $\theta d$ in the slab-width direction becomes half of the original value.

Figure 18A:
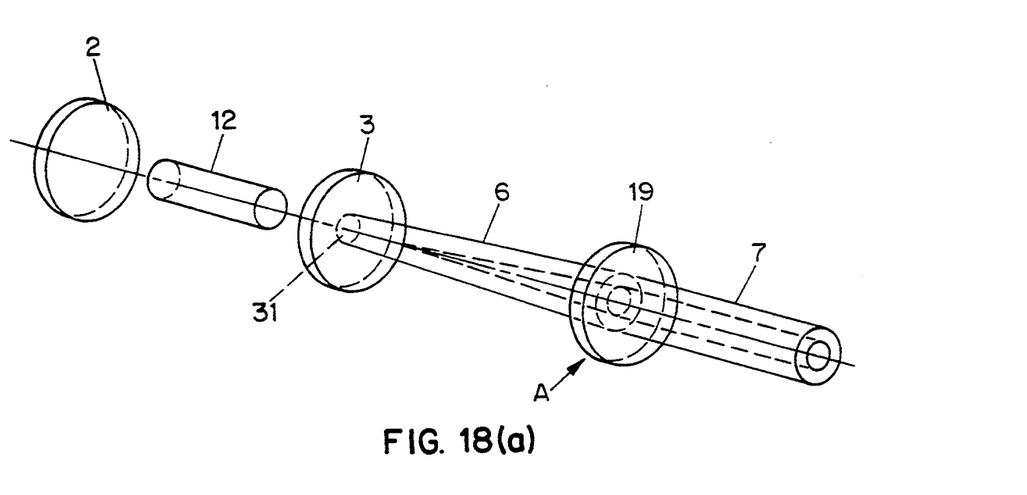
FIG. 18a is a perspective view of a solid-state laser device illustrating the preferred ninth embodiment.
Figure 18B:
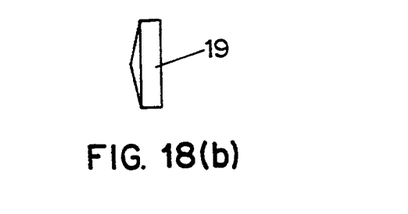

FIG. 18a shows a hole-type output mirror 3 and a rod-type solid-state laser medium 12. Output light 6 expands conically. Because divergence along the thickness of the cone is small, although the over-all divergence is large, a beam with small total divergence can be obtained by converting the light into a cylindrical beam by means of an AXICON (conical lens, also shown in FIG. 19b). A laser beam with small $\theta d$ can be obtained as described for FIG. 12.

Figure 19:
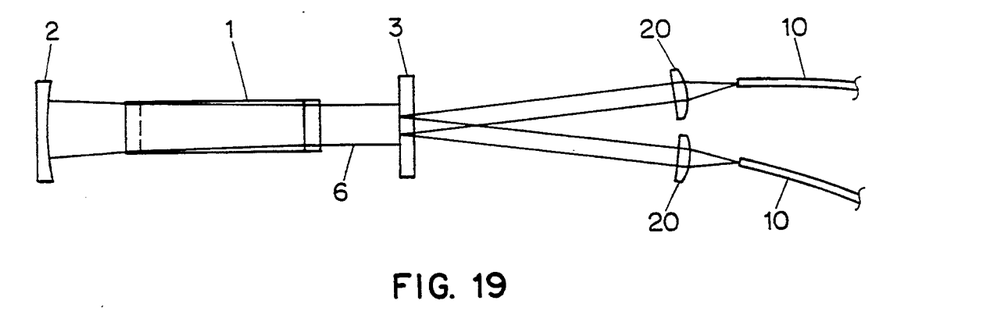
FIG. 19 is a front view of a solid-state laser device illustrating the preferred tenth embodiment.

FIG. 19 shows a slab laser with hole-type output mirror 3. The two separated output beams 6 are input into separate optical fibers 10. The $\theta d$ values of the two beams are very small, as described above, and a greater range of input conditions for the fibers facilitates alignment of the input beams.

Figure 20:
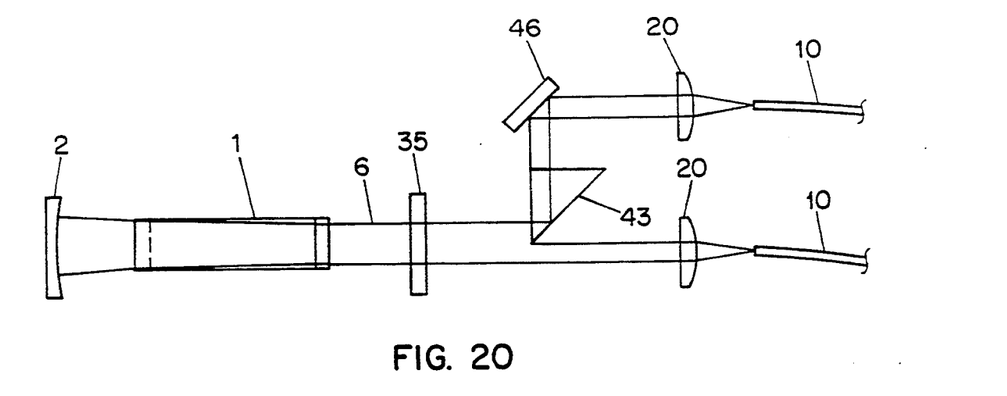
FIG. 20 is a front view of a solid-state laser device illustrating the preferred eleventh embodiment.

FIG. 20 shows an ordinary partially transmitting mirror 35 as the output mirror, and two beams with $\theta d$ values equal to half their original value are obtained as described for FIG. 17. The respective beams are input into separate optical fibers 10 using focusing lenses 20. Alignment is facilitated as described for FIG. 19.

Figure 21:
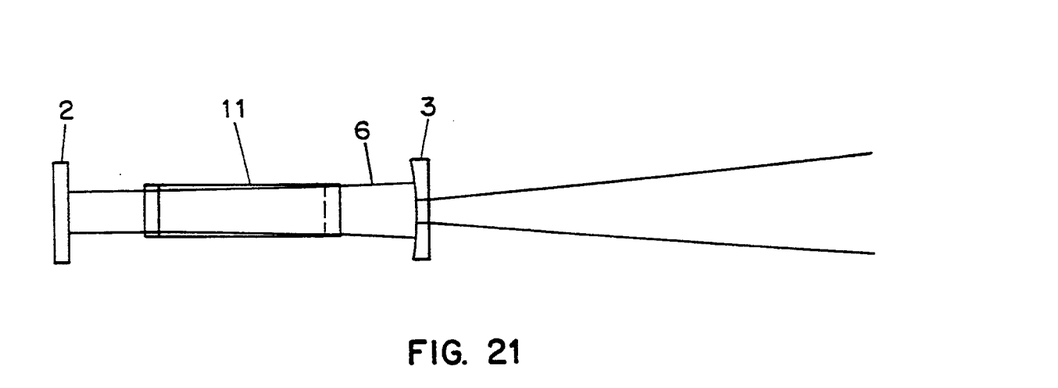
FIG. 21 is a front view of a solid-state laser device illustrating the preferred twelfth embodiment.

FIG. 21 shows a slab-shaped laser medium 11. Differing from the above hole-type output mirror systems, the total reflection mirror 2 is flat, and the output mirror 3 is concave. Because the total beam divergence is smaller than in a system with a flat hole-type output mirror, this configuration is suitable for purposes in which output beams are used as is, without further convergence into a single beam. Instead of a slab-shaped laser medium, a rod-shaped medium may be included.

Conventionally, as described above, using a pinhole mirror as the output mirror has posed a problem in that the effective transmittance of the output mirror is reduced. In accordance with an aspect of the present invention, this difficulty is overcome by including a central low-reflectance region instead. Specifically, an output mirror is included whose reflection face has greater transmittance at the part corresponding to the pinhole, and greater reflectance in other parts, instead of using an actual hole. This facilitates manufacture of an output mirror for partial reflection at the hole-type region. When a laser beam is reflected only partly at the hole-type region, part of the laser beam that has reached that region remains in the resonator. This enables the laser beam to be reflected repeatedly between the total reflection mirror and the output mirror in the optical resonator, it prevents formation of a non-oscillating region, and it helps to maintain efficiency. The performance of the solid-state laser device can be improved further still by combining this system with a beam expander.

In the first embodiment, the beam expander is arranged so that the beam diameter of the laser beam is reduced in a direction toward the output mirror. By reducing the beam diameter of the laser beam before the output mirror, the effective transmittance can be increased even if the diameter of the hole-type region is reduced. Arranging the beam expander in this manner can be related to the technique according to (b) in conventional technology described earlier, where increased reduction results in a reduced stable oscillation region. According to an aspect of the invention, the reduction factor can be set as small as the $\theta d$ value can be reduced by the output mirror, thereby increasing the stable region, and enabling targeted performance to be achieved under a wider range of operating conditions.

In the second embodiment, the beam expander is arranged in the optical resonator so that the beam diameter of the laser beam increases in a direction toward the output mirror. Since the $\theta d$-value does not change before and after the lens, as explained earlier, the beam spread angle $\theta$ in the output light beam is decreased when the light beam is expanded in this arrangement. Also, because the beam diameter "d" increases, the $\theta d$-value in the light beam cannot be reduced if a normal output mirror is used. However, by using a hole-type output mirror according to an aspect of the invention, a laser beam with smaller $\theta d$-value can be produced. Arranging the beam expander in this manner differs from the technique according to (b) of conventional technology described earlier. The stable region can be expanded, with a reduced $\theta d$ value.

Figure 4:
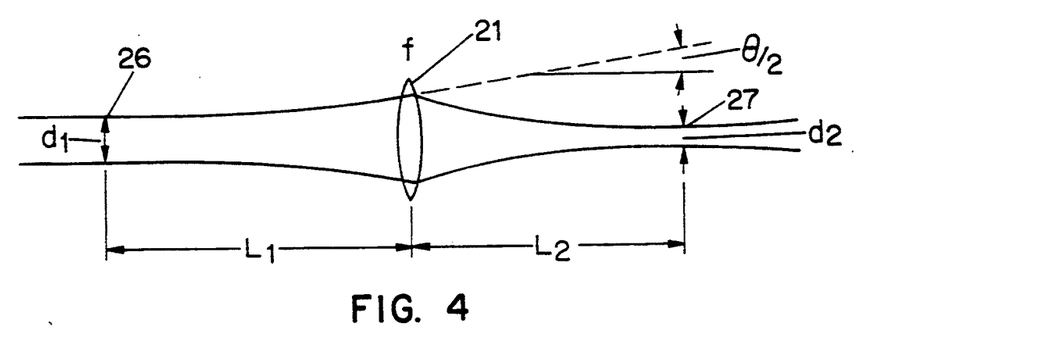
FIG. 4 is a schematic for the relationship between a convex lens and a beam waist.

One or the other of these two systems may be preferred depending on the distance between the output mirror and the light focusing lens. FIG. 4 shows a case where the light focusing lens is a convex lens 21 with a focal length "f" placed at a distance $L_1$ from a first beam waist 26 with a diameter $d_1$ and a second beam waist 27 with a diameter $d_2$ formed at a distance $L_2$ from the convex lens 21. In this case, the following formula (2) can be applied:

$$1/d_2^2 = 1/d_1^2(1-L_1/f)^2 - (1/f\theta)^2 \qquad (2)$$

where $\theta$ is the beam divergence angle on the left side of the convex lens 21. In an optical resonator with a flat output mirror, the first beam waist 26 is formed on the output mirror.

If the light focusing lens 21 is spaced at a large distance $L_1$ from the output mirror, the second term in formula (2) can be disregarded, so that $$d_2 \approx d_1[1-(L_1/f)] \qquad (3)$$

Formula (3) shows that reducing the beam diameter $d_1$ also reduces the beam diameter $d_2$, so that the first embodiment is preferred for this case.

If, on the other hand, the light focusing lens 21 is placed close to the output mirror, and particularly if the distance $L_1$ is close to the focal length "f" the first term in formula (2) can be ignored, and the relation becomes $$d_2 \approx f\theta \qquad (4)$$

In this case, the second embodiment is preferred.

With formula (3), the beam spread angle $\theta$ does not directly affect the beam diameter $d_2$. However, if the beam spread angle $\theta$ is large, the diameter of the laser beam that reaches the light focusing lens 21 becomes larger, thereby requiring the diameter of the lens to be increased and the light focusing angle to become larger, which is not desirable. A small beam spread angle $\theta$ remains desirable.

If formula (4) is applicable, the beam diameter $d_2$ is determined by the beam spread angle $\theta$ alone. If the beam diameter $d_1$ is large, a large-diameter lens is also required. Therefore, it is important for both of the light focusing systems that the $\theta d$ value be kept small, and it is desirable that the two systems be used selectively depending on the location of the light focusing lens 21.

In the third embodiment, a columnar light guiding path is employed, having approximately the same diameter as that of the region of the hole-type output mirror emitting the laser beam in a slab laser using the output mirror of the present invention. This arrangement repeats and equalizes total reflection on the side face of the light guiding path when the laser beam advances through the light guiding path, wherein the cross section of the laser beam output from the light guiding path becomes circular. In addition, because the $\theta d$ value is equalized, it is possible to concentrate a laser beam into a circular spot.

In the fourth embodiment, a conical light guiding path has approximately the same diameter on its light admitting side as in the region of the output mirror emitting a laser beam. The light guiding path can be connected to an optical fiber at the laser beam emitting end of the light guiding path. The conical light guiding path has been described in the paper by I. K. Ilev et al., Optical and Quantum Electronics, Vol. 23 (1991), p. 101, which is hereby incorporated by reference. According to this arrangement, the laser beam output from the output mirror is converged to a targeted beam diameter while repeating total reflection on the conical face of the light guiding path. In such a case, the beam spread angle $\theta$ increases as the beam diameter is converged, but the $\theta d$ value is conserved. To converge an ordinary laser beam with a large diameter down to the diameter of an optical fiber by a conical light giving path alone would require a path too long for practical application. However, if the targeted $\theta d$ value has been achieved at the output point of the output mirror, it is possible to admit the laser beam into an optical fiber with small diameter directly, with the $\theta d$ value retained.

Figure 5:
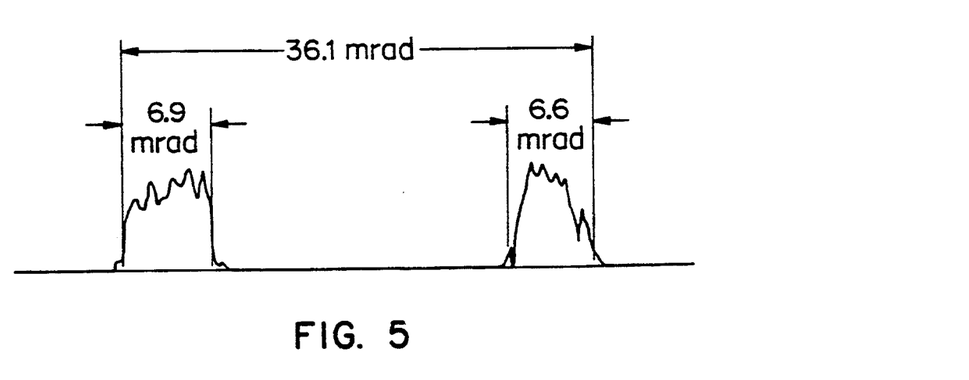
FIG. 5 is a diagram of a measured far-field pattern of a slab laser with a hole-type output mirror.

In the fifth, sixth, seventh, ninth, and tenth embodiments, for a slab laser using a hole-type output mirror according to an aspect of the present invention, laser output light is divided into two beams, in a resonator configuration that forms a beam waist on the output mirror. Such a resonator configuration can be achieved by making the hole-type mirror flat and the total reflection mirror concave. FIG. 5 is a far-field pattern (FFP) of the laser output light, measured using a slab laser having a hole-type output mirror with a low reflectance region 6 mm in diameter. This shows that, with the output light divided into two beams and the total beam divergence as large as 36 mrad, the divergence of the respective beams is as small as 7 mrad or less.

Figure 6:
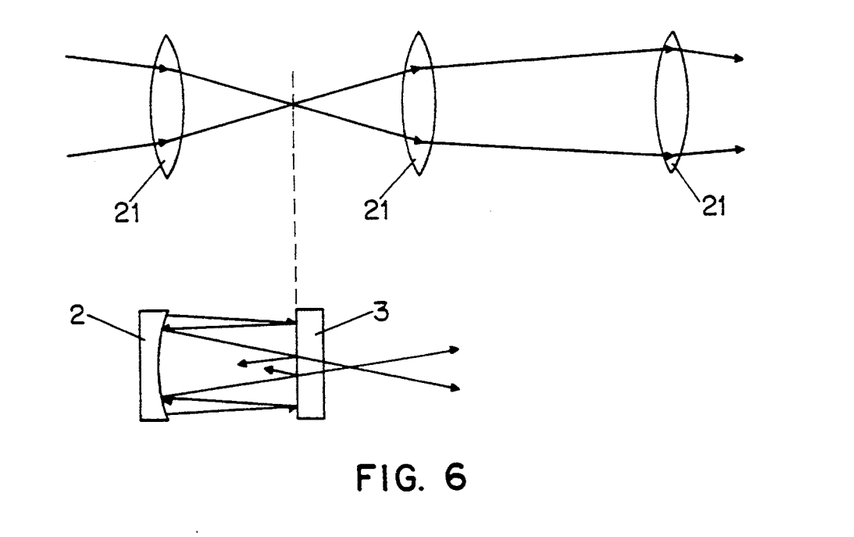
FIG. 6 is a schematic for the output from a slab laser with a hole-type output mirror, separated into two beams.

This phenomenon can be explained by comparing the hole-type output mirror resonator with the array of convex lenses 21, as shown in FIG. 6. When the hole-type output mirror is used, only rays with a large slope can be transmitted. The effective transmittance of the output mirror is determined approximately by the ratio of the beam cross-section area in the resonator to the area of the mirror's hole-type portion. Therefore, the effective transmittance is larger for a low-order mode oscillating at the central part, and smaller for a high-order mode, so that it is almost exclusively the highest-order mode which oscillates in the hole-type output mirror resonator.

The highest-order mode corresponds to a ray that propagates waves over the total width in the lens array. As can be seen in FIG. 6, this ray has its slope maximized when it crosses the center of the output mirror. Thus, in the hole-type output mirror resonator, the light circulating over the entire region restricted by the laser medium strikes the area of low reflectance when its slope reaches the maximum, and is then extracted outside. The hole-type output mirror not only regulates the "d" value, but also acts to select and output light with a specific slope.

According to the conception described so far, $\theta$ is 36 mrad, and $\theta d = 36 \times 6 = 216$ mm mrad. However, if $\theta d$ is considered as essentially a measure of brightness (brightness $\propto 1/\theta d$), the deficient central part should be removed because $\theta$ is the angle occupied by the diverging light. In other words, $\theta d = 7 \times 2 \times 6 = 84$ mm mrad in effect.

If a focusing lens is placed close to the output mirror, the advantages associated with the deficient part at the center of an output beam cannot be utilized because the diameter of the focused beam is determined by the overall $\theta$. On the other hand, if the focusing lens is placed at a distance from the output mirror, to focus the light in a region that is consistent with formula (3), it is not possible to keep the focusing lens sufficiently far from the output mirror when the output light is divided into two beams, and the diameter of the light-focusing spot cannot be made small.

When, in the fifth embodiment, light beams 71 and 72, which are divided as shown in FIG. 7a, are corrected approximately parallel by means of a roof prism 13, the overall $\theta$ can be made 7 mrad as a minimum, where "d" is 12 mm as a minimum. This makes the value of $\theta d$ at least 84 mm mrad, which agrees with the above effective $\theta$d.

In the sixth embodiment, one of the divided output beams is returned at a corner cube, and re-introduced into the resonator at the low reflectance region of the output mirror. This makes the minimum value of "d" equal to 6 mm, hence $\theta$d can be made 42 mm mrad as a minimum.

In the seventh embodiment, a linearly polarized laser beam is produced in the same resonator as in the fifth and sixth embodiments. The polarization plane of one of the two divided beams is rotated by 90° and superimposed on the other beam. This results in a value of $\theta$d=42 mm mrad, as in the sixth embodiment.

In the eighth embodiment, for an ordinary slab laser not using a hole-type output mirror, linearly polarized laser light oscillates. The laser output beam is divided into two beams in the slab width direction, the polarization plane of one of the divided two beams is rotated by 90°, and the beams are mutually superposed. This makes the value of $\theta$d equal to one-half of the $\theta$d value of the laser output beam.

The ninth embodiment represents an application of a hole-type output mirror to a rod-type solid-state laser. When a hole-type output mirror is used in a rod-type laser, a laser beam is output as an annular cone (rather than a pair of beams as from a slab laser). Therefore, using the same conception as in the fifth embodiment, this cone-shaped beam is converted into a cylindrical beam by means of a conical lens (AXICON) that reduces the total beam divergence.

In the tenth embodiment, laser beams are input into two optical fibers. In a slab laser using a hole-type output mirror as described above, the output light is divided into two components, making the respective $\theta$d values very small. By inputting these beams into separate optical fibers, there will be greater flexibility in establishing a light-inputting condition, which facilitates the adjustment process. Finer optical fibers can also be used.

In the eleventh embodiment, a laser beam is input into two or more optical fibers. A slab laser has a large $\theta$d in the slab width direction, but a small $\theta$d in the slab thickness direction. By dividing a laser beam into several spatially separated beams in the slab width direction, "d" can be reduced to 1/(number of split beams), and a laser beam can be obtained with smaller $\theta$d values vertically and horizontally. Similarly, $\theta$ can be reduced if the laser beam is divided at a position distant from the output mirror. Thus, in this embodiment, plural laser beams with $\theta$d values equal to the 1/(number of split beams) can be obtained regardless of the position where the beam is divided. By inputting these lights into separate optical fibers, there will be greater flexibility in establishing the light-inputting condition, thus facilitating the adjustment process. Also, finer optical fibers can be used.

The twelfth embodiment differs from the other embodiments, which form a beam waist on the above-mentioned hole-type output mirror, in that the hole-type output mirror is placed at a position where the diameter of the laser in the resonator becomes large. This technique corresponds to the case where a concave mirror 2 shown in FIG. 6 is used as a hole mirror. Since the slope of the ray passing through the region of low reflectance becomes smaller as it gets further from the beam waist, the total beam divergence in this arrangement becomes smaller than where the hole-type output mirror is placed on the beam waist. Thus, this system is convenient if the light output from the hole-type output mirror is used as it is output, although not suitable for the purpose of dividing the beam.

In all embodiments, except the eighth and the eleventh, a transmitting portion in the output mirror which is used to reduce the $\theta$d-value of a laser beam is formed by using a high-transmittance area with low reflectance, rather than an actual hole. This prevents the formation of non-oscillating regions where a hole diameter is large, and thus prevents loss of solid-state laser efficiency.

According to the first, second, fifth, sixth, eighth, ninth, and twelfth embodiments, the problem in the conventional solid-state laser wherein attempts to reduce $\theta$d also reduce the range of output that can be oscillated stably is solved, and a solid-state laser device that outputs a laser beam with small $\theta$d in a wide output range can be provided.

According to the fourth, tenth, and eleventh embodiments of the present invention, a problem is solved in conventional solid-state lasers where adjusting a laser beam for admission into an optical fiber was difficult and where complicated adjustment procedures were required. A solid-state laser device is provided that allows the light to be admitted into optical fibers with ease.

I claim:

1. A solid-state laser device for emitting a laser beam, comprising:
   (a) a total reflection mirror;
   (b) means for reducing the $\theta$d of said laser-beam, wherein said reducing means includes an output mirror having an inside surface and an outside surface, said inside surface facing said total reflection mirror, and being of high reflectance except at a predetermined central region and of low reflectance at said predetermined central region; and
   (c) a solid-state laser medium disposed between said total reflection mirror and said inside surface of said output mirror.

2. The solid-state laser device of claim 1, wherein said reducing means further includes a beam expander disposed between said output mirror and said solid-state laser medium.

3. The solid laser device of claim 2, wherein said beam expander comprises:
   (i) a concave lens disposed between said output mirror and said solid-state laser medium; and
   (ii) a convex lens disposed between said concave lens and said solid-state laser medium,
   whereby said laser beam is expanded when passing through said beam expander from said output mirror to said solid-state laser medium.

4. The solid-state laser device of claim 2, wherein said beam expander comprises:
   (i) a convex lens disposed between said output mirror and said solid-state laser medium; and
   (ii) a concave lens disposed between said convex lens and said solid-state laser medium,
   whereby said laser beam is expanded when passing through said beam expander from said solid-state laser medium to said output mirror.

5. The solid-state laser device of claim 1, further including a conical light guiding path having a light-admitting side and a light-emitting side;
   said light-admitting side being disposed on said outside surface of said output mirror; and said conical light guiding path having a diameter which is approximately equal to a shortest cross-distance of said predetermined central region of said output mirror at said light-admitting side and which gradually decreases towards said light-emitting side.

6. The solid-state laser device of claim 1, wherein said solid-state laser medium is a slab-shaped solid-state laser medium having two opposing, optically polished sides, so that said laser beam will advance while repeating total reflection alternately on said optically polished sides.

7. The solid-state laser device of claim 6, further including a columnar light guiding path disposed on said outside surface of said output mirror, said columnar light guiding path having a diameter approximately equal to a shortest cross-distance of said predetermined central region of said output mirror.

8. The solid-state laser device of claim 6, wherein said total reflection mirror and said output mirror are configured and arranged to divide said laser beam into first and second laser output beams.

9. The solid-state laser device of claim 8, wherein said output mirror is flat and said total reflection mirror is concave, said concave total reflection mirror being configured and arranged to reflect at least part of said laser beam to said predetermined central region of said output mirror, so that a laser beam waist is formed on and about said predetermined central region of said output mirror.

10. The solid-state laser device of claim 8, wherein said reducing means further comprises a correction optic system for aligning in parallel said first and second laser output beams.

11. The solid-state laser device of claim 10, wherein said correction optic system comprises a roof shaped prism disposed at a predetermined distance from said output mirror, with its roof ridge line perpendicular to a plane comprising said first and second laser output beams and midway between said first and second laser output beams.

12. The solid-state laser device of claim 10, said outside surface of said output mirror being of high reflectance except at a predetermined central region, and low reflectance at said predetermined central region, wherein said correction optic system comprises a right-angled prism disposed to reverse said first laser output beam, so that said first laser output beam is re-reflected by said high reflection region of said outside surface of said output mirror.

13. The solid-state laser device of claim 10, said outside surface of said output mirror being of high reflectance except at a predetermined central region, and low reflectance at said predetermined central region, wherein said correction optic system comprises a corner cube disposed to reverse said first laser output beam, so that said first laser output beam is re-reflected by said high reflection region of said outside surface of said output mirror.

14. The solid-state laser device of claim 8, said outside surface of said output mirror being of high reflectance except at a predetermined central region, and low reflectance at said predetermined central region, wherein said reducing means further comprises means for reversing said first laser output beam, so that said first laser output beam re-enters said predetermined central region of said output mirror.

15. The solid-state laser device of claim 14, wherein said reversing means comprises a right-angled prism.

16. The solid-state laser device of claim 14, wherein said reversing means comprises a corner cube.

17. The solid-state laser device of claim 8,
wherein said slab-shaped solid-state laser medium is cut to convert said laser beam into a linearly polarized laser beam whereby said first and second laser output beams are polarized in the same plane; and
wherein said solid-state laser device further comprises means for converting said laser output beams into elliptically polarized light.

18. The solid-state laser device of claim 17, wherein said converting means comprises:
means, disposed in the path of said first laser output beam, for converting said first laser output beam into linearly polarized light with a plane of polarization perpendicular to said plane of polarization of said second laser output beam; and
means for superimposing said converted first laser output beam and said second laser output beam.

19. The solid-state laser device of claim 18, wherein said superimposing means comprises:
a 45-degree mirror, disposed in the path of said converted first laser output beam, so that said converted first laser output beam is reflected perpendicularly towards said second laser output beam; and
a polarization beam splitter, disposed in a mutual path of said output beams to pass said converted first laser output beam and reflect at a right angle said second laser output beam thereby forming one beam.

20. The solid-state laser device of claim 8, further including means for admitting said laser output beams into separate optical fibers.

21. The solid-state laser device of claim 20, wherein said admitting means comprises two converging lenses, each being disposed in a path of said laser output beams.

22. The solid-state laser device of claim 7, 10, 14, 17 or 20, wherein said predetermined central region of said output mirror is of a striped form.

23. The solid-state laser device of claim 1, wherein
said solid-state laser medium is a cylindrical solid-state laser medium, whereby said laser beam, upon passage through said output mirror, propagates in a spreading conical form; and
said reducing means further includes means for converting said spreading laser beam into a conical laser beam.

24. The solid-state laser device of claim 23, wherein said converting means is a conical lens.

25. The solid-state laser device of claim 1, wherein said total reflection mirror and said output mirror are configured and arranged to maximize a diameter of said laser beam at said output mirror.

26. The solid-state laser device of claim 25, wherein said total reflection mirror is flat-faced and said output mirror is concave.

27. The solid-state laser device of claim 3, 4, 5, 7, 10, 14, 17, 20, 23 or 25, wherein said predetermined central region of said output mirror is circular in form.

28. The solid-state laser device of claim 1, 2, 3, 4, 5, 25 or 26, wherein
said solid-state laser medium is a slab-shaped solid-state laser medium; and
said predetermined central region of said output mirror is of a striped form.

29. A solid-state laser device for emitting a laser beam, comprising:
 (a) a total reflection mirror;
 (b) means for reducing the θd of said laser beam, wherein said reducing means includes:
  (i) a partially permeable output mirror having an inside surface and an outside surface, said inside surface facing said total reflection mirror; and
  (ii) means, disposed at a predetermined distance from said outside surface of said output mirror, for splitting said laser beam into a plurality of laser output beams; and
 (c) a solid-state laser medium disposed between said total reflection mirror and said inside surface of said output mirror, wherein said solid-state laser medium is a slab-shaped solid-state laser medium having two opposing, optically polished sides, so that said laser beam will advance while repeating full reflection alternately on said optically polished sides.

30. The solid-state laser device of claim 29, wherein said splitting means comprises a prism disposed to intercept and reflect part of said laser beam.

31. The solid-state laser device of claim 29, wherein said plurality of laser output beams consists of first and second laser beams;
 said slab-shaped solid-state laser medium is cut to convert said laser beam into a linearly polarized laser beam whereby said first and second laser output beams are polarized in the same plane; and
 said solid-state laser device further comprises means for converting said laser output beams into elliptically polarized light.

32. The solid-state laser device of claim 31, wherein said converting means comprises:
 means, disposed in the path of said first laser output beam, for converting said first laser output beam into linearly polarized light with a plane of polarization perpendicular to said plane of polarization of said second laser output beam; and
 means for superimposing said converted first laser output beam and said second laser output beam.

33. The solid-state laser device of claim 32, wherein said superimposing means comprises:
 a 45-degree mirror, disposed in the path of said converted first laser output beam, so that said converted first laser output beam is reflected perpendicularly towards said second laser output beam; and
 a polarization beam splitter, disposed in a mutual path of said output beams to pass said converted first laser output beam and reflect at a right angle said second laser output beam thereby forming one beam.

34. The solid-state laser device of claim 29, further including means for admitting said laser output beams into separate optical fibers.

35. The solid-state laser device of claim 34, wherein said admitting means comprises a plurality of converging lenses, each said converging lens being disposed in a path of one of said laser output beams.

* * * * *

UNITED STATES PATENT AND TRADEMARK OFFICE
CERTIFICATE OF CORRECTION

PATENT NO. : 5,402,438
DATED : March 28, 1995
INVENTOR(S) : Ryohei Tanuma

It is certified that error appears in the above-indentified patent and that said Letters Patent is hereby corrected as shown below:

Title page:   1st Column, following second line of Item [30], insert --Oct. 15, 1993 [JP] Japan .......... 5-257369--.

Signed and Sealed this

Thirteenth Day of June, 1995

Attest:

BRUCE LEHMAN

Attesting Officer          Commissioner of Patents and Trademarks